(12) United States Patent
Metz et al.

(10) Patent No.: US 7,684,059 B2
(45) Date of Patent: Mar. 23, 2010

(54) DEVICE FOR DETERMINING THE POSITION OF AN OBJECT MOVABLE ALONG AT LEAST ONE DISPLACEMENT DIRECTION

(75) Inventors: Gerald Metz, St. Georgen (DE); Christian Spaeth, Rosenheim (DE); Holmer Dangschat, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 12/301,424

(22) PCT Filed: Feb. 7, 2007

(86) PCT No.: PCT/EP2007/001025

§ 371 (c)(1), (2), (4) Date: Dec. 9, 2008

(87) PCT Pub. No.: WO2007/134653

PCT Pub. Date: Nov. 29, 2007

(65) Prior Publication Data

US 2009/0190130 A1    Jul. 30, 2009

(30) Foreign Application Priority Data

May 18, 2006    (DE) .................. 10 2006 024 579

(51) Int. Cl.
*G01B 11/14* (2006.01)
*G01B 11/00* (2006.01)

(52) U.S. Cl. .............. 356/614; 356/615; 356/616; 356/634; 250/237 G; 33/707

(58) Field of Classification Search ......... 356/600–640, 356/399–401; 250/237 G, 231.14, 231.16; 33/125 C, 125 R, 706, 707
See application file for complete search history.

(56) References Cited

U.S. PATENT DOCUMENTS 4,519,709 A * 5/1985 Nelle .................. 356/619

(Continued)

FOREIGN PATENT DOCUMENTS

| DE | 42 19 311 | 12/1992 |
|---|---|---|
| EP | 0 793 870 | 9/1997 |
| WO | WO 2005/115687 | 12/2005 |

OTHER PUBLICATIONS

International Search Report, International Application No. PCT/EP2007/001025, dated Feb. 7, 2007 (English-language translation provided).

*Primary Examiner*—Sang Nguyen
(74) *Attorney, Agent, or Firm*—Kenyon & Kenyon LLP

(57) ABSTRACT

A device for determining the position of an object that is movable along at least one displacement direction, the or each displacement direction having assigned to it one length measuring device for measuring the position of the object along the respective spatial direction, includes: at least one scale extending along a displacement direction of the object to be measured as a first component of the respective length measuring device; a scanning head for scanning the scale as a second component of the respective length measuring device such that a change in the position of the scale with respect to the scanning head along the associated displacement direction of the object to be measured is measurable, one of the two components of the respective length measuring device being moved together with the object to be measured along the respective displacement direction when the latter is moved; and a device for determining the distance of the component of the respective length measuring device, which is movable together with the object to be measured, from the object to be measured along the measuring direction of the associated length measuring device.

The device for determining the distance of the component of the respective length measuring device, which is movable together with the object to be measured, from the object to be measured includes a measuring graduation as a first module and an associated measuring head as a second module, one of the two modules being provided on the object to be measured and the other of the two modules being provided on the component of the length measuring device that is movable together with the object to be measured.

11 Claims, 8 Drawing Sheets

U.S. PATENT DOCUMENTS

| | | | |
|---|---|---|---|
| 4,606,642 A * | 8/1986 | Nelle | 356/619 |
| 4,766,310 A * | 8/1988 | Michel | 250/237 G |
| 4,793,067 A * | 12/1988 | Reimar et al. | 33/707 |
| 5,247,165 A | 9/1993 | Hiruta et al. | |
| 5,642,013 A | 6/1997 | Wavre | |
| 5,910,691 A | 6/1999 | Wavre | |
| 6,175,414 B1 * | 1/2001 | Holzapfel et al. | 356/620 |
| 6,198,534 B1 * | 3/2001 | Hofer et al. | 356/399 |
| 7,164,482 B2 * | 1/2007 | Benner et al. | 356/620 |
| 7,414,736 B2 * | 8/2008 | Stadler | 356/614 |

\* cited by examiner

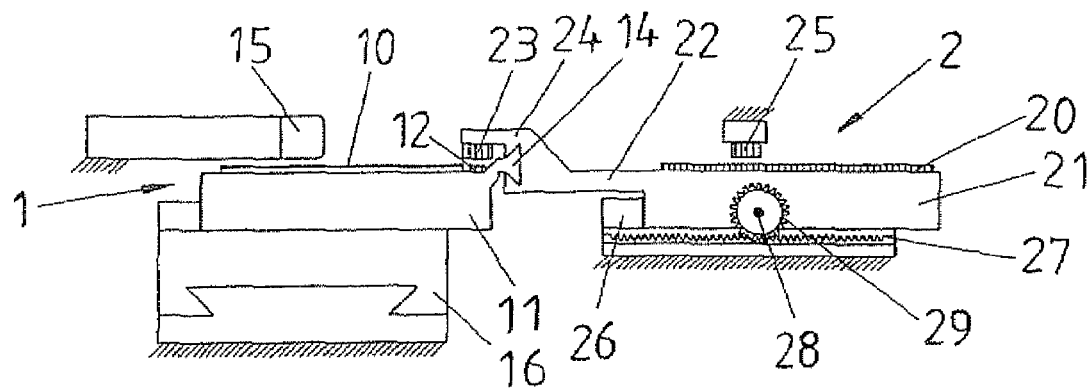
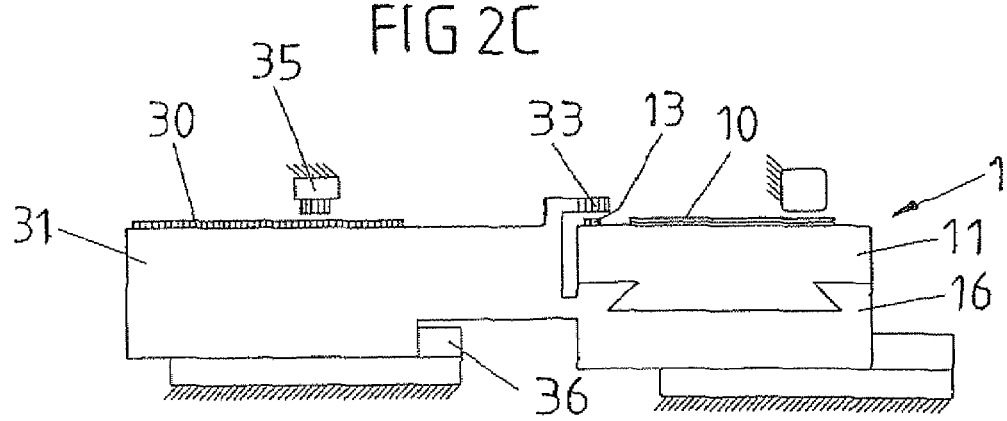

DEVICE FOR DETERMINING THE POSITION OF AN OBJECT MOVABLE ALONG AT LEAST ONE DISPLACEMENT DIRECTION

FIELD OF THE INVENTION

The present invention relates to a device for determining the position of an object movable along at least one displacement direction (that is, along a first direction and possibly along a second and/or third direction).

BACKGROUND INFORMATION

Such a device includes at least one scale that extends as a first component of a length measuring device along the associated displacement device, that is, e.g. the first direction, and an associated scanning head for scanning the scale as a second component of the length measuring device, relative to which the scale is movable along the first direction such that a change in the position of the scale with respect to the scanning head along the first direction is measurable, either the scale or the scanning head being moved together with the object to be measured along the first direction and further a device being provided for determining the distance of the component of the length measuring device, which is movable together with the object to be measured, from that object.

German Patent No. 42 19 311 describes a device in the form of a displacement detector that includes a chassis; a contactless sensor (distance sensor) in the form of a focus sensor for measuring the distance between the sensor and a surface (mirror surface) of an object to be measured; a linear scale that is firmly connected to the focus sensor by a connecting part; a device for reading out the graduation marks of the linear scale; an actuator for moving the focus sensor and the linear scale, whereby the linear scale and the focus sensor are moved together relative to the chassis; and a control circuit for operating the actuator.

The linear scale and the associated device for reading out the graduation marks of the linear scale (scanning head) are used to ascertain a movement of the object to be measured, the linear scale being movable together with that object and the associated device for reading out the graduation marks of the linear scale being connected in a stationary manner to the chassis of the displacement detector. Using the contactless sensor provided on the linear scale in the form of a focus sensor as a device for determining the distance between the linear scale and the surface of the object to be measured it is possible to determine the distance between the linear scale and the object to be measured. Consequently, no particularly high demands have to be placed on the tracking of the linear scale when the object to be measured is moved, because the focus sensor associated with the linear scale is able to ascertain the distance between the linear scale and the object to be measured.

A movement of the object to be measured or of the considered surface of the object is ascertained on the basis of the relative movement of the linear scale with respect to the associated device for reading out the graduation marks of the linear scale, it being possible for tracking errors of the linear scale to be corrected (compensated) on the basis of the measuring results of the focus sensor concerning the distance between the linear scale and the object to be measured or its considered surface.

Such a displacement detector has the disadvantage that due to fluctuations of the parameters of the ambient air (air parameter changes), in particular the refractive index, the measuring results of the contactless sensor are subject to uncertainties and are thus not sufficiently exact for high-precision measurements.

SUMMARY

Example embodiments of the present invention provide an improved device for determining the position of an object movable along at least one displacement direction.

Example embodiments of the present invention provide for a device for determining the distance between the component of the length measuring system that is movable together with the object to be measured on the one hand and the object to be measured itself on the other hand to include a measuring graduation as a first module and an associated measuring head as a second module, one of the two modules being provided on the object to be measured (i.e. being connected to it so as to travel along with it) and the other of the two modules being provided on the component of the length measuring device that is movable together with the object to be measured (i.e. being connected to it so as to travel along with it).

This approach provides that, for determining the distance between the object to be measured and the component of the length measuring device that is movable (displaceable) together with the object to be measured, another length measuring system is used that is based on the principle of scanning a measuring graduation using an associated measuring head. This makes the measuring results independent of the parameters of the ambient air.

The device for determining the position of an object movable along one or more displacement directions may be provided not only for measurements in the narrower sense, for example for calibrating a cross grating provided on the object, but it may also be used (by interacting with a control device which utilizes the ascertained position values for control purposes) for positioning the object to be measured when machining the object, for example for exposing structures of a photosensitively coated plate (photolithography) or for engraving using a laser or milling tool.

The device may be used to determine the position of an object movable along two linearly independent displacement directions (in particular perpendicular with respect to each other), e.g. of an object fixed on a measuring table. In this case, each of the two displacement directions has a length measuring device assigned to it, which as a first component has a scale extended along the respective displacement direction and as a second component a scanning head provided for scanning this scale such that for each of the two displacement directions a change of the position of the scanning head relative to the respectively assigned scale is measurable, in each of the two length measuring devices either the scale or the scanning head being moved together with the object to be measured along the respective displacement direction. Furthermore, each of the two length measuring devices is assigned to a device for determining the distance of the component of the respective length measuring device movable together with the object to be measured from the object to be measured along the respective displacement direction. The two devices for determining the distance between the component of the respective length measuring device that is movable together with the object to be measured and the object to be measured itself along the respective displacement direction include respectively a measuring graduation as a first module and an associated measuring head as a second module, one of the two modules being respectively provided on the object to be measured and the other of the two modules being connected to the component of the length measuring device that is movable together with the object to be measured along the respective displacement direction.

Such a device makes it possible to measure any movement of the object to be measured in a plane that is respectively representable as a superposition (combination) of movements along the two linearly independent displacement directions to which respectively one of the two length measuring devices is sensitive.

The two components of the length measuring devices that are not movable together with the object to be measured, which are, in particular, the scanning heads of the length measuring devices, may be connected to each other in a rigid manner.

Accordingly, the component of a length measuring device that is movable together with the object to be measured may be the scale of the length measuring device. The measuring head, which is used for scanning a measuring graduation provided on the object to be measured, may be situated on the scale, in particular by a rigid connection that travels along with it.

Both the at least one scale (e.g., movable together with the object to be measured) as well as the at least one measuring graduation (e.g., provided on the object to be measured) may have respectively one incremental track (incremental graduation) in the form of a periodic mark graduation.

The object to be measured may be a measuring plate, e.g. fixed on a so-called measuring table, which is displaceable in one plane and which has a scanning device assigned to it that scans a measuring graduation provided on the measuring plate and which may thereby measure movements of the measuring plate in the specified plane. The device for determining the position of an object displaceable along at least one displacement direction, in particular along two displacement directions spanning a plane, in this case a measuring plate, is used to test and, if required, calibrate the position measuring device made up of the measuring plate and the associated scanning device.

For this purpose, the components of the respective length measuring device, that is, in particular, the scanning heads of the two length measuring devices, that are not movable together with the object to be measured, that is, the measuring plate, are rigidly connected to the scanning device that is used to scan the measuring plate.

In order to be able to move the object to be measured along the at least one displacement direction (first and/or second direction), on the one hand a drive may be assigned to the object to be measured itself for each provided displacement direction, which is able to produce a desired movement of the object to be measured along the respective displacement direction. In this instance, the movable component of the respective length measuring device may either be carried along passively or the latter may have a drive of its own assigned to it, the corresponding drive assigned to the object to be measured on the one hand and the drive assigned to the respective length measuring device on the other hand being synchronized such that, in the event of a movement of the object to be measured, the movable component of the length measuring device is carried along respectively substantially by the same distance. Possible deviations are measured by the associated device for determining the distance between the component of the respective length measuring device that is movable together with the object to be measured and the object itself, and may thus be compensated.

The component of a respective length measuring device that is movable together with the object to be measured may be moved by a drive and may pull the object to be measured. This arrangement provides that no heat input occurs on the object to be measured itself.

Alternatively, for each displacement direction, the object to be measured may have assigned to it a separate drive sled that is situated at a distance from, yet connected to the object to be measured, which takes the object to be measured along for a movement along the respective displacement direction.

Further details and aspects of example embodiments of the present invention are described in more detail below with reference to the figures.

BRIEF DESCRIPTION OF THE DRAWINGS

FIG. 2b is a first lateral view of the arrangement illustrated in FIG. 2a.

FIG. 2c is a second lateral view of the arrangement illustrated in FIG. 2a.

FIG. 5b is a partial view of the arrangement illustrated in FIG. 5a.

FIG. 6 is a more detailed top view of the arrangement as shown in FIG. 5a.

DETAILED DESCRIPTION

Figure 1:
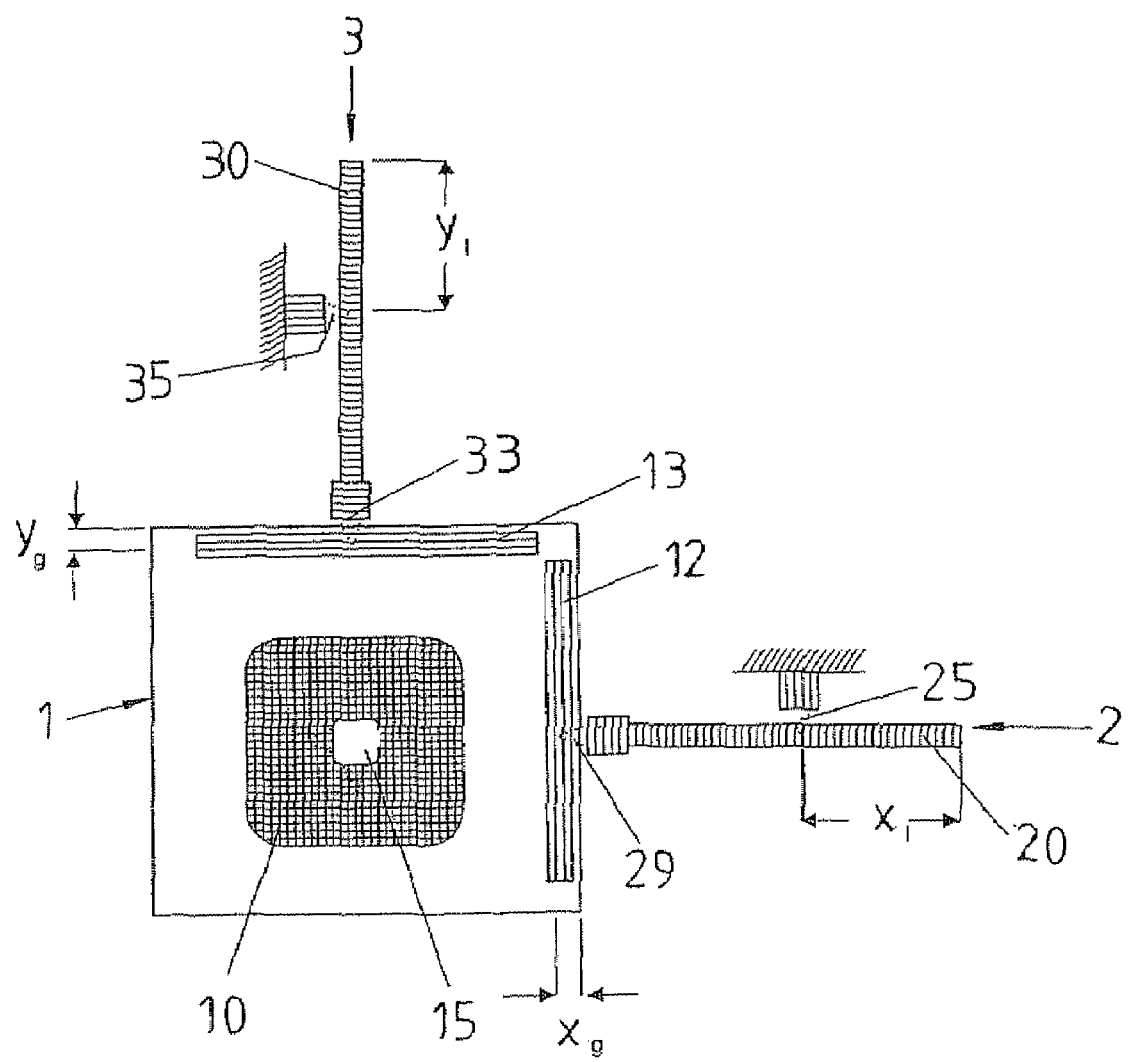
FIG. 1 is a schematic top view of a measuring table displaceable in a plane along two spatial directions perpendicular to each other, on which an object to be measured is situated, each spatial direction having assigned to it a length measuring device for measuring the extent of a movement of the measuring table.

FIGS. 1 and 2a through 2c show a measuring table 1, which has a measuring plate 10 as the object to be measured that is movable (displaceable) via a cross guide 11, 16 in a plane (x, y plane) along two spatial directions x and y perpendicular to each other (displacement directions) and fixed on the measuring table, which measuring plate 10 in the exemplary embodiment is provided on its surface facing away from the cross guide 11, 16 with a measuring graduation, for example in the form of a cross graduation, which may be scanned by a scanning device 15. Scanning device 15 is situated in a stationary manner, that is, it is not movable together with measuring plate 10 of measuring table 1, such that the extent of a movement of measuring plate 10 along each of the two spatial directions x, y may be ascertained by scanning the measuring graduation provided on measuring plate 10 using scanning device 15.

Cross guide 11, 16 includes a table component (lower plate 16) that is movable along second spatial direction y and a table component (upper plate 11) movable upon it along first spatial direction x, which table component (upper plate 11) is movable along both spatial directions x, y and supports measuring plate 10.

In the present case, additionally two length measuring devices 2, 3 are provided for determining the extent of a movement of measuring plate 10 along each of the two spatial directions x, y. These may be used on the one hand to measure the extent of a movement of measuring plate 10 along the two spatial directions x, y independently of and in addition to scanning device 15 and thereby to check the precision of a measurement made by scanning device 15 and the associated measuring graduation of measuring plate 10. Alternatively, the two length measuring devices 2, 3, however, may also be provided solely for determining a movement of measuring plate 10 along the two spatial directions x, y. The two length measuring devices 2, 3 are respectively assigned to one of the two spatial directions x, y and are used for measuring movements of measuring plate 10 along the respectively assigned spatial direction x or y (measuring direction of the respective length measuring device).

Each of the two length measuring devices 2, 3 includes a longitudinal guide 21, 26 and 31, 36, including a stationary guide part 26 and 36, respectively, and a longitudinally movable guide part 21, 31 guided on top of it along the respective spatial direction x or y. The movable guide part 21, 31 of the respective length measuring device 2 and 3 supports a scale 20 or 30 which extends along the relevant associated spatial direction (measuring direction) x or y, a periodic (incremental) measuring graduation (having in each case at least one reference mark) being provided on the respective scale 20 and 30, which measuring graduation includes a plurality of graduation marks situated periodically one behind the other along the respective spatial direction x and y. Measuring direction x or y of the respective length measuring device 2 or 3 is accordingly determined by the extension direction of scale 20 and 30 of the respective length measuring device 2, 3, which coincides with the direction of movement of movable guide part 21 or 31 of the respective length measuring device 2, 3.

Alternatively, scales 20, 30 may each also be provided with an absolute coding, that provide a valid position immediately after the start of operation and thus do not require a reference travel to a reference mark.

Scanning device 15 or more precisely its head provided for scanning measuring plate 10 may be situated at the intersection of longitudinal axes 200, 300 of the two scales 20, 30, that is, in the linear extension of the two scales 20, above measuring table 1 and in particular measuring plate 10. Such an array of scales 20, 30 with respect to scanning device 15 is used so as to be able to measure and if necessary to position free of angle errors of cross guide 11, 16. Such an array corresponds to an Abbe array.

Scales 20, 30 of the two length measuring devices 2, 3 are scanned by respectively one associated stationary scanning head 25 and 35, that is, one that is not movable together with measuring table 1, which makes it possible to determine the extent of the movement of the respective longitudinally movable guide part 21, 31 of length measuring devices 2, 3 together with measuring table 1 along the respective measuring direction x and y.

A first of the two longitudinally movable guide parts 21, 31 is connected via a connecting segment 22 and a wraparound 24 provided on connecting segment 22 to measuring table 1, more precisely to its upper plate 11, and thus (via measuring table 1 or its upper plate 11) to measuring plate 10 in that wraparound 24 embraces an associated fastening region 14 of measuring table 1.

For this purpose, wraparound 24 of length measuring device 2 and associated fastening region 14 of measuring table 1 are arranged such that, in the event of a movement of measuring table 1 along measuring direction x of considered length measuring device 2, movable guide part 21 and associated scale 20 of length measuring device 2 are moved as movable components of the length measuring device together with measuring plate 10 along first spatial direction x as the measuring direction. Conversely, however, movable guide part 21 of considered length measuring device 2 is not carried along in a movement of measuring plate 10 along the other spatial direction y, which extends perpendicular to measuring direction x of the considered length measuring device 2.

The coupling of length measuring device 2 assigned to first spatial direction x to measuring table 1 via a wraparound 24 such that its movable guide part 21 is only carried along in the event of a movement of measuring plate 10 along the associated first spatial direction x, but not in the event of a movement of measuring plate 10 along the other, second spatial direction y is required because first length measuring device 2 is coupled to measuring table 1 via the latter's upper plate 11, which is movable along both spatial directions x, y, because it rests, movable along first spatial direction x, on lower plate 16 which is in turn movable along second spatial direction y.

In contrast, length measuring device 3 assigned to second spatial direction y, which is used to determine movements of measuring plate 10 along second measuring direction y, is coupled directly by the (rigid) connection of a connecting segment 32 of longitudinally movable guide part 31 to the table component movable only along second spatial direction y, that is, to lower plate 16. Since table component 16, to which guide part 31 is fastened via connecting segment 32, is in any event only able to move along spatial direction y assigned to second length measuring device 3 as measuring direction, it is not necessary to provide for a coupling via a wraparound that would permit relative movements of the respective table component 16 relative to the guide part 31 along another direction (x).

The two measuring devices 2, 3 are thus connected—on the one hand via a wraparound 24 and the associated fastening region 14 of measuring table 1 or upper plate 11 and on the other hand by direct connection to lower plate 11 of the measuring table—(indirectly) to measuring plate 10 of measuring table 1 such that, in the event of a movement of measuring plate 10 along a direction corresponding to measuring direction x or y of the respective length measuring device 2, 3, the longitudinally movable guide part 21 or 31 and the associated scale 20 and 30, respectively, of measuring device 2, 3 are moved together with measuring plate 10. In the event of a movement of measuring plate 10 fixed on upper plate 11 of measuring table 1 along a spatial direction y or x that extends perpendicular to measuring direction x or y of the respective length measuring device 2, 3, movable guide part 21 or 31 of the respective length measuring device 2, 3 is on the other hand not moved together with measuring table 1. For this purpose, fastening region 14 of measuring table 1 is arranged as a longitudinal guide that engages in a longitudinally movable manner with wraparound 24 associated with the corresponding length measuring device 2, fastening region 14 of measuring table 1 associated with a length measuring device 2 extending with its guide direction perpendicularly to measuring direction x of associated length measuring device 2.

Thus, as a result, the relative movement of measuring plate 1 is made possible in relation to each of the two length measuring devices 2, 3 along a direction perpendicular to measuring direction x or y of the respective length measuring device 2, 3; and length measuring devices 2, 3 are decoupled from lateral movements of measuring plate 10 with respect to measuring direction x or y of the respective length measuring device 2, 3.

Figure 2A:
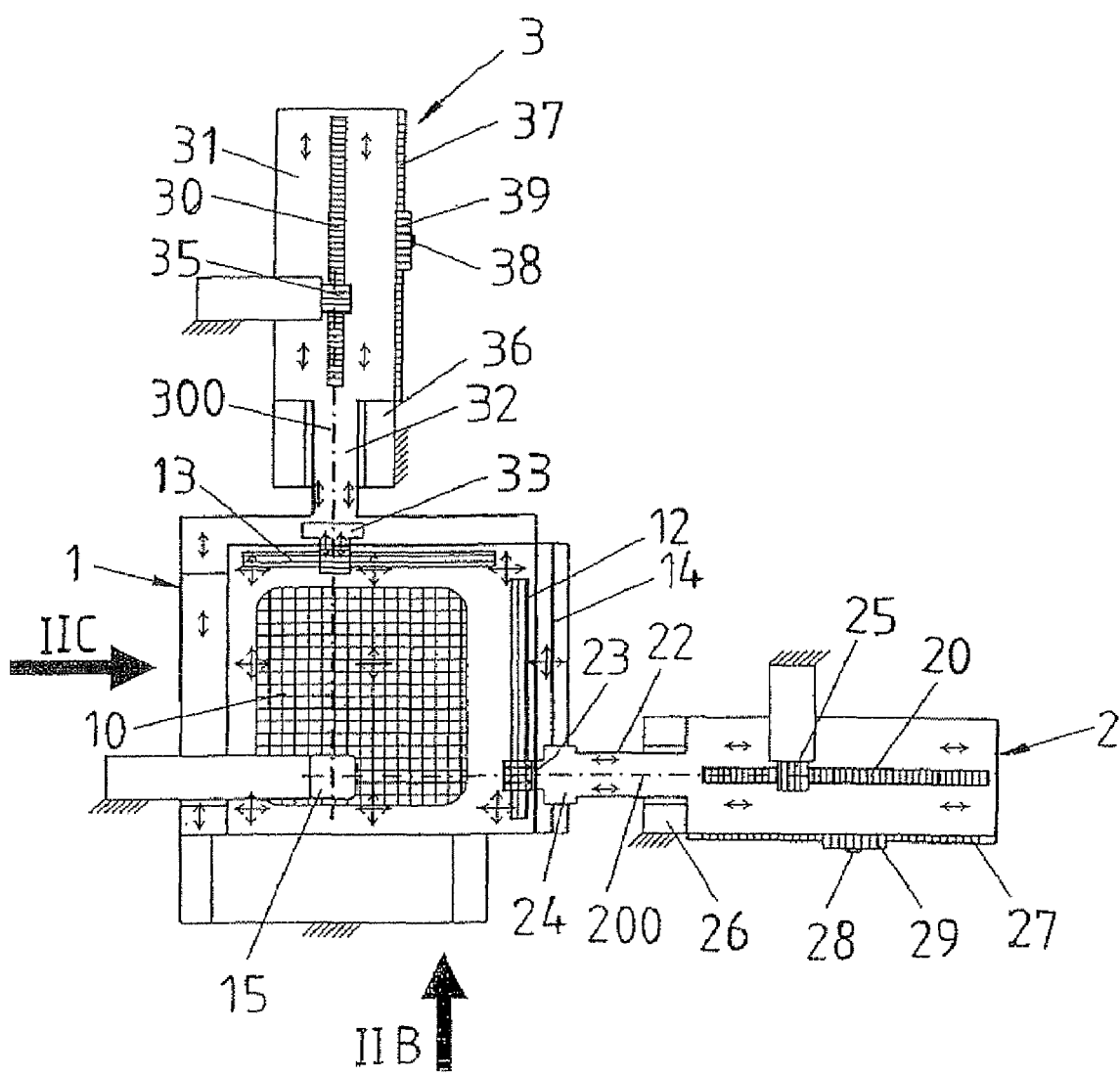
FIG. 2a is a more detailed top view of an arrangement as shown in FIG. 1.

Alternatively, the two longitudinally movable guide parts 21, 31 may also be coupled via respectively one wraparound to the upper plate 11 of measuring table 1 that is movable along both spatial directions x, y in that second length measuring device 3 is coupled in a corresponding manner to upper plate 11 as shown in FIGS. 2a through 2c for first length measuring device 2.

In the exemplary embodiment shown in FIGS. 1, 2a, 2b and 2c, measuring table 1 is not directly driven for a movement along the two spatial directions x, y; rather drive devices are assigned to each of the two length measuring devices 2, 3, which allow for a movement of longitudinally movable guide part 21 or 31 of the respective length measuring device 2, 3 with respect to the associated stationary guide part 26, 36. The respective drive device includes a toothed rack 27, 37 situated or arranged on stationary guide part 26 or 36 of the respective length measuring device 2, 3 and extending along the respective measuring direction x or y, which is engaged with a toothed wheel 29 or 39 supported on the respective longitudinally movable guide part 21 or 31 on a rotating shaft 28 or 38. Turning the respective drive shaft 28 or 38 using an associated drive motor initiates a rotation of the toothed wheel 29 or 39 that is supported in a rotating manner on the respective longitudinally movable guide part 21 or 31, toothed wheel 29 or 39 rolling off with its outer toothing on toothed rack 27 or 37 of the associated stationary guide part 26, 36. Depending on the direction of rotation of the respective toothed wheel 29 or 39, this produces a relative movement of the longitudinally movable guide part 21, 31 of the respective length measuring device 2, 3 with respect to stationary guide part 26, 36 along the respectively assigned spatial direction or measurement direction x, y, measuring plate 10 connected via measuring table 1 to longitudinally movable guide part 21, 31 of length measuring devices 2, 3 being carried along therewith. Alternatively, length measuring devices 2, 3 may also have a linear motor assigned to them for producing a relative movement.

The toothed rack drives described above are intended merely to represent a linear drive generally, which allows for the generation of a linear movement of the respective longitudinally movable guide part 21 and 31 with respect to the associated stationary guide part 26 or 36. Accordingly, linear drives other than toothed rack drives may be used as well for producing the longitudinal movement of the respective longitudinally displaceable guide part 21, 31, which drives, however, are generally not so easy to illustrate. Regarding a utilizable linear drive, reference is made to European Published Patent Application No. 0 793 870 for example.

The arrangement shown in FIGS. 1 through 2c provides that there is no heat input into the length measuring devices 2, 3 on measuring table 1 itself due to the assignment of the drive devices by which the movement of measuring table 1 and the two scales 20, 30 along the two spatial directions x, y is produced.

Next to measuring plate 10, two incremental measuring graduations 12, 13, which are respectively assigned to one of the two length measuring devices 2, 3, extend on measuring table 1, more precisely on its upper plate 11 supporting measuring plate 10. Incremental measuring graduations 12, 13 include a plurality of graduation marks arranged one behind the other along measuring direction x or y of the respectively assigned length measuring device 2 or 3, which are scannable by a measuring head 23 or 33 rigidly connected to longitudinally movable guide part 21, 31 of the associated length measuring device 2, 3 via a respective connecting segment 22, 32. By scanning measuring graduations 12, 13 provided next to measuring plate 10 on measuring table 1 using the measuring heads 23, 33 that are movable together with scales 20, 30 of length measuring devices 2, 3, changes in the distance of scales 20, 30 from measuring table 1 (or from its upper plate 11 and thus from measuring plate 10) along the respective measuring direction x or y may be measured, which may, for example, be due to an existing play in the interaction between a wraparound 24 and the associated fastening region 14. This makes it possible to compensate for fluctuations in the distance between the respective scale 20, 30 of length measuring devices 2, 3 and measuring table 1. Expressed in other words, a measurement of the extent of a movement of measuring plate 10 along the one and/or other spatial direction x, y is made up of a measuring result of the respective length measuring device 2 or 3, produced by scanning the respective scale 20 or 30 using the associated scanning head 25, 35, as well as of the change in distance between the respective scale 20, 30 and measuring plate 10 possibly accompanying a movement of measuring plate 10 along the one or the other direction x, y, which change in distance is measured by scanning measuring graduations 12, 13 provided next to the measuring plate using the respective measuring head 23, 33. As so-called straightness rods, measuring graduations 12, 13 provided next to measuring plate 10 are also used to prevent effects of straightness deviations and a possible slack of cross guide 11, 16 on the measuring results.

The position values for a respective spatial direction x, y are respectively obtained as the sum $x_l+x_g$ or $y_l+y_g$ of a measuring result $x_l$ or $y_l$ of the respective length measuring device 2, 3 and a measuring result $x_g$ or $y_g$ of devices 12, 23; 13, 33 for measuring changes in distance between the scale 20, of the respective length measuring device 2, 3 and measuring table 1 or more precisely measuring plate 10.

In the event of an application of length measuring devices 2, 3 for testing the precision of a measuring graduation (for example in the form of a cross grating graduation) provided on measuring plate 10 and scanned by an associated scanning device 15, scanning device 15 assigned to the measuring graduation of measuring plate 10 is connected, e.g., rigidly to the scanning heads 25, 35 of the two length measuring devices 2, 3. Furthermore, scanning device 15 may be located at a position above measuring plate 10 coinciding with an intersection of the measuring axes of the two length measuring devices 2, 3.

The arrangement shown in FIGS. 1 through 2c for determining a position, however, may be used not only as a measuring arrangement for calibrating a measuring plate 10, but also as an arrangement for a highly precise positioning of a machining unit such as, for example, a light-exposing unit, a laser arrangement or a milling cutter above an object to be positioned by table 1 and to be machined by the machining unit.

FIGS. 3a, 3b, 4a and 4b show different variations of the arrangement illustrated in FIGS. 1 through 2c, that is, with regard to the drive device(s) by which a joint movement of measuring table 1 or measuring plate 10 on the one hand and scales 20, 30 on the other hand is effected. This will be explained subsequently with reference to FIGS. 3a through 4b, respectively beginning from the lateral view shown in FIG. 2b, in an exemplary manner with reference to length measuring device 2, which makes it possible to determine the position of measuring table 1 or of its upper plate 11 and thus of measuring plate 10 along the first spatial direction x (direction of displacement). The subsequent considerations, however, apply in the same manner also to second length measuring device 3, which is provided for determining the position of upper plate 11 of measuring table 1 or of measuring plate 10 along the second spatial direction y.

Figure 3A:
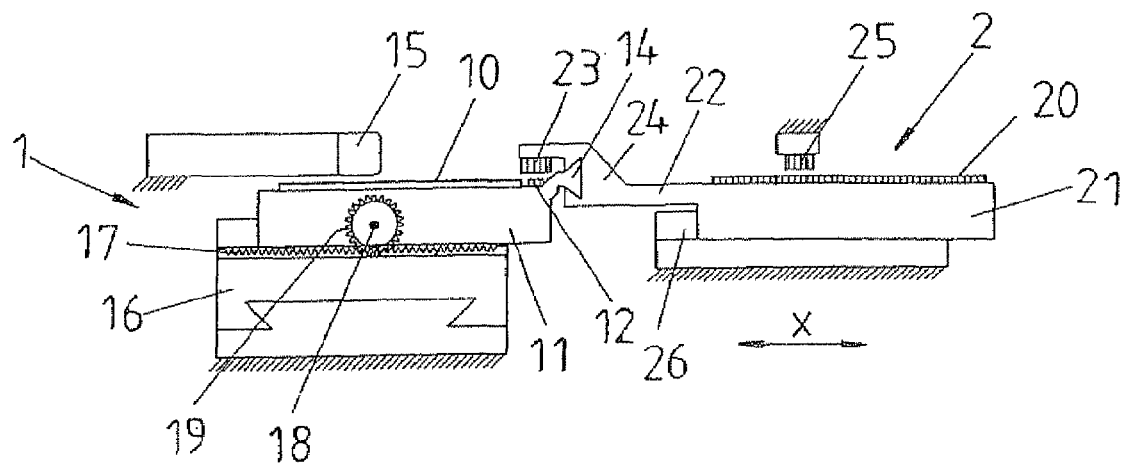
FIG. 3a illustrates a first variation of the arrangement illustrated in FIGS. 2a, 2b and 2c with respect to the drive device for moving the measuring table.

The arrangement shown in FIG. 3a differs from that shown in FIGS. 1 through 2c in that the drive devices used for producing the movement of measuring table 1 and of scales 20, 30 are not assigned to length measuring devices 2, 3, but rather to measuring table 1, FIG. 3a showing specifically the drive device used for producing a movement along the first direction x.

In this instance, as in the case of the arrangement shown by FIGS. 1 through 2c, the drive devices themselves include for each spatial direction one toothed rack 17 and a toothed wheel 19 supported on a shaft 18 and engaged with toothed rack 17.

The observation made above in connection with FIGS. 1 through 2c that the toothed rack drives represented in the individual drawings are each to represent a linear drive that may also have a completely different construction than a toothed rack drive also applies to FIGS. 3a through 4b.

In the exemplary representation of FIG. 3a, toothed rack 17 on the one hand and toothed wheel 19 on the other hand are situated on two elements of cross guide 11, 16 of measuring table 1, which are displaceable with respect to each other along first spatial direction x, in order to be able to produce a movement (displacement) along the first spatial direction x. Concretely, it is thereby possible to move a table component 11, which is displaceable along the first spatial direction x and which directly supports measuring plate 10, along that spatial direction x.

Drive devices constructed in the same manner are provided so as to be able to displace a second table component 16 supporting first table component 11 along the second spatial direction y.

In a deviation from the arrangement illustrated in FIGS. 1 through 2c, in this instance, the longitudinally displaceable guide parts (for example 21) and the respectively associated scale (for example 20) of length measuring devices 2, 3 are passively carried along in the movement of measuring plate 10 along a respective spatial direction x or y (caused by the drive devices acting on the measuring table).

Figure 3B:
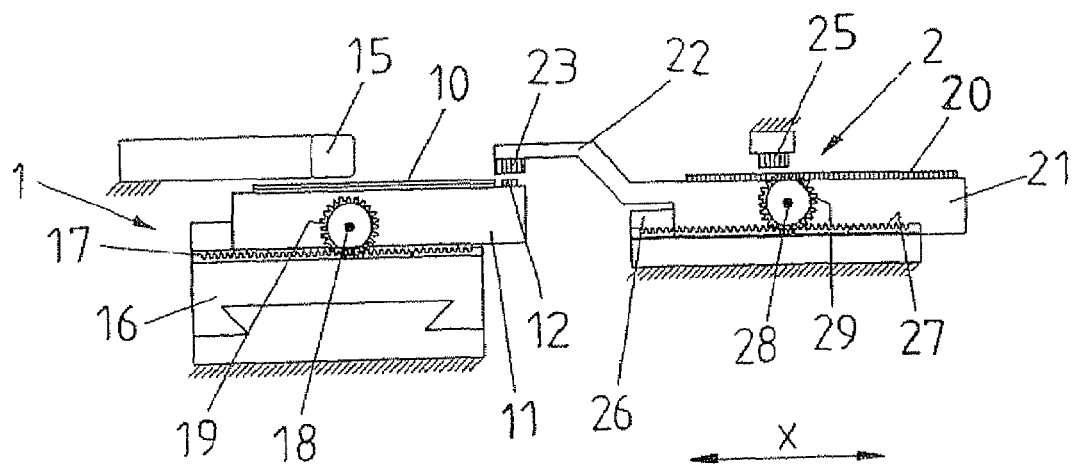
FIG. 3b illustrates a second variation of the arrangement illustrated in FIGS. 2a, 2b and 2c with respect to the drive device for moving the measuring table.

FIG. 3b shows a refinement of the arrangements illustrated in FIGS. 2b and 3a, both measuring table 1 and the length measuring devices (for example 2) each having drive devices assigned to them for a movement along the first or second spatial direction x, y. In this case, the components of length measuring devices 2, 3 (for example scale 20 assigned to first spatial direction x), which are movable together with the object to be measured (measuring plate 10), are not connected to measuring table 1. Instead, the drive device on the side of the measuring table on the one hand and the drive device on the side of the length measuring devices on the other hand are synchronized such that along both spatial directions x, y there is a uniform (synchronous) movement of measuring table 1 on the one hand and of length measuring devices 2, 3 on the other hand. Possible deviations from a uniform movement may here again be corrected by the fact that it is possible to measure and thus to compensate for changes in the distance between length measuring devices 2, 3 and measuring table 1 along the respective spatial direction x or y (direction of measurement) via measuring heads 23, 33 on the side of the length measuring devices and the associated measuring graduations 12, 13 on the side of the measuring table.

Figure 4A:
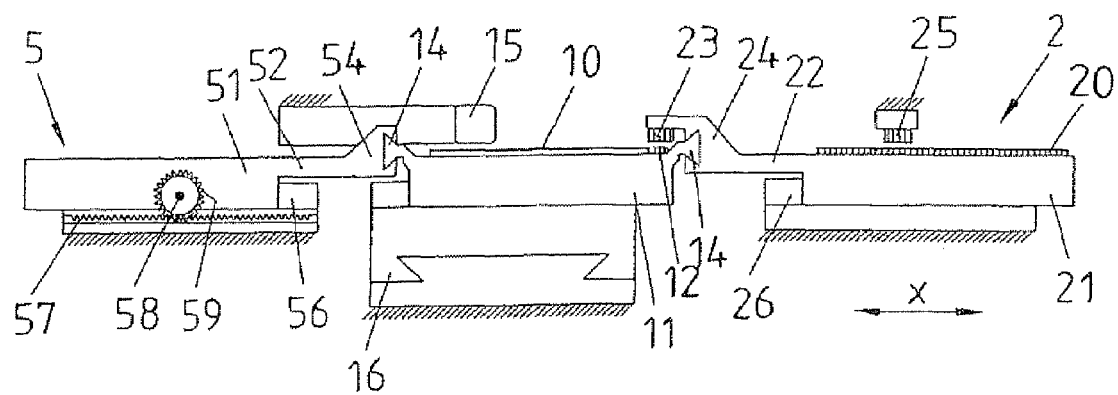
FIG. 4a illustrates a third variation of the arrangement illustrated in FIGS. 2a, 2b and 2c with respect to the drive device for moving the measuring table.

FIG. 4a shows a variation of the exemplary embodiment illustrated in FIG. 3a, the difference being that the drive devices are not assigned directly to measuring table 1, but that rather measuring table 1 for each of the two spatial directions x, y has assigned to it one drive sled 5, which includes a stationary guide part 56 and a longitudinally movable guide part 51 guided on it along the respective spatial direction x or y, the one stationary guide part 56 being assigned a toothed rack 57 and the other longitudinally movable guide part 51 being assigned a toothed wheel 59 supported in a rotationally fixed manner on shaft 58 and engaged with toothed rack 57. By having toothed rack 57 driven by shaft 58 of toothed wheel 59 via a rotary motor, a longitudinal movement of longitudinally displaceable guide part 51 may be produced with respect to stationary guide part 56.

Longitudinally movable guide part 51 is connected via a connecting region 52 and a wraparound 54 to a fastening region 14 of measuring table 1, that is, in the same manner as described above with reference to wraparound 24 of the length measuring device 2 and the associated fastening region 14 of measuring table 1.

Accordingly, in the arrangement shown in FIG. 4a, measuring table 1 or measuring plate 10 are pulled along the two spatial directions x, y by respectively one drive sled 5, which has a longitudinally movable guide part 51 connected to the measuring table. Since in addition the components of length measuring devices 2, 3 (scales 20, 30), which are movable together with measuring table 1 or measuring plate 10, are also connected to measuring table 1 in the manner described above with reference to FIGS. 1a through 2c, they are carried along in the respective spatial direction x and/or y in the event of a movement of measuring table 1 or of its upper plate 11 and thus of measuring plate 10 brought about by drive sleds 5.

Figure 4B:
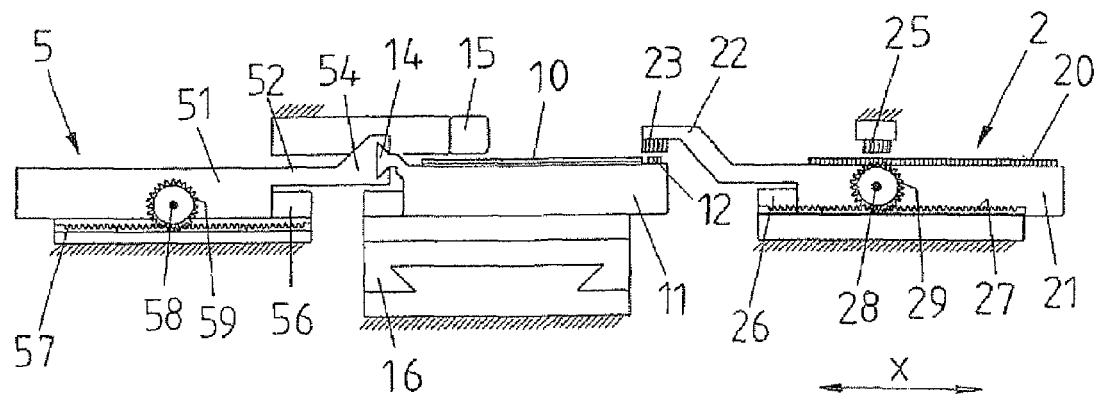
FIG. 4b illustrates a fourth variation of the arrangement illustrated in FIGS. 2a, 2b and 2c with respect to the drive device for moving the measuring table.

FIG. 4b shows a variation of the arrangement illustrated FIG. 4a, separate drive devices being assigned to length measuring devices 2, 3, as shown in exemplary fashion in FIG. 4b with reference to length measuring device 2 acting along first spatial direction x. These are synchronized with the drive devices of the respective drive sled 5 acting on measuring table 1 such that a substantially synchronous movement of drive sleds 5 and of measuring table 1 on the one hand and of movable components 20, 30 of length measuring devices 2, 3 on the other hand may occur along the respective spatial direction 2 or 3. A connection between measuring table 1 and the components (scales 20, 30) of length measuring devices 2, 3 movable together with measuring table 1 is not required in this case.

Because of the use of separate drive sleds for moving measuring table 1, the arrangements shown in FIGS. 4a and 4b, like the arrangement shown in FIG. 2b, provide that there is no heat input on measuring table 1. To be sure, separate drive sleds 5, namely, one drive sled 5 for each of the two spatial directions x, y, are required for this purpose, which entails an increased space requirement of the arrangement as a whole.

Figure 5A:
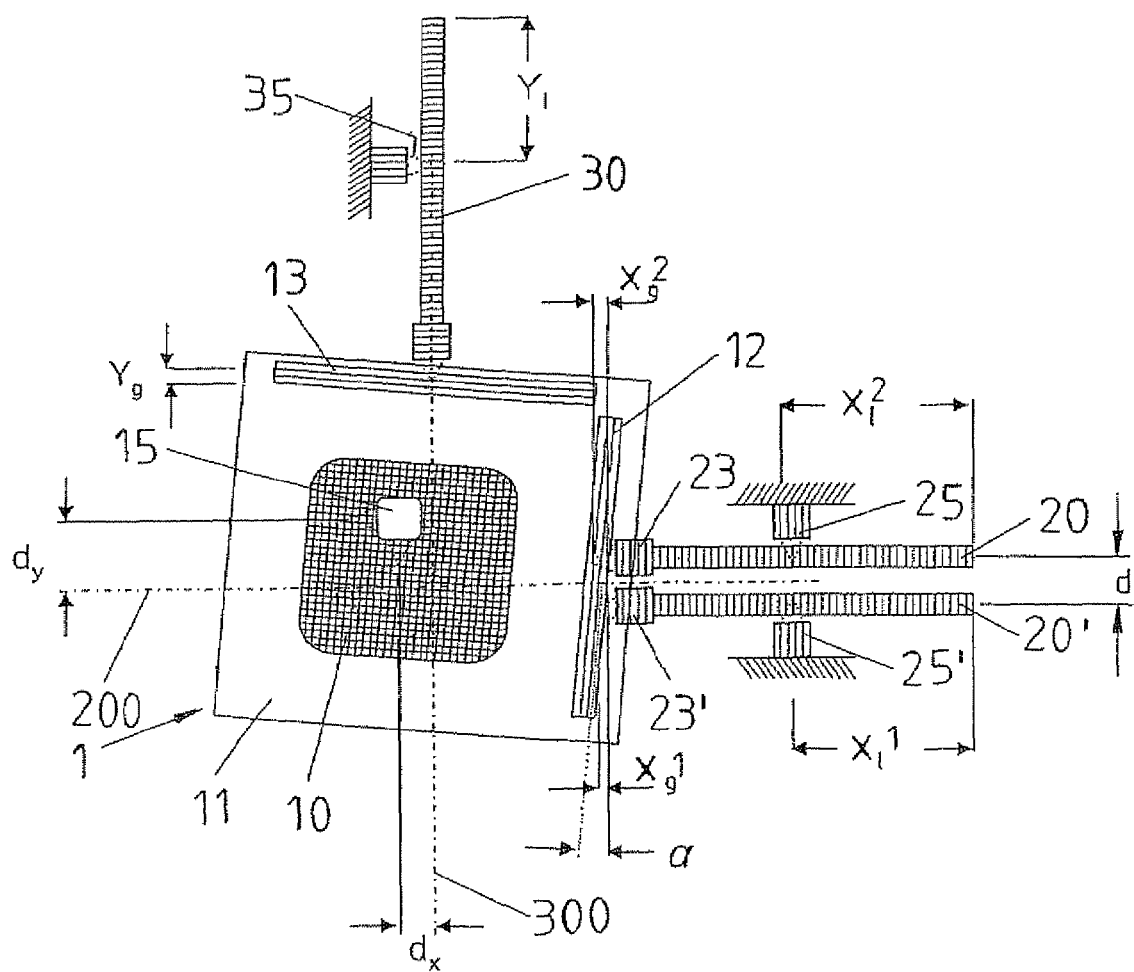
FIG. 5a is a schematic top view of a measuring table displaceable in a plane along two spatial directions perpendicular to each other, on which an object to be measured is situated, one spatial direction having assigned to it a length measuring device for measuring the extent of a movement of the measuring table that is expanded in comparison to FIG. 1.
Figure 5B:
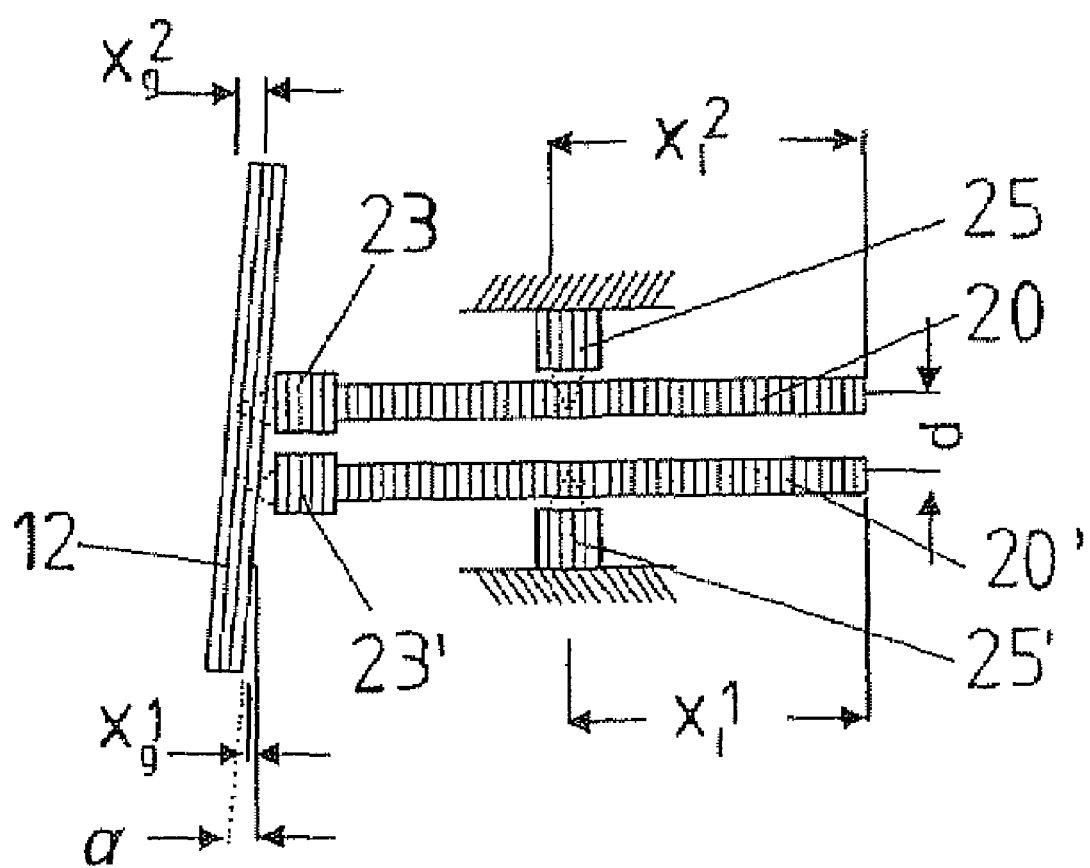
Figure 6:
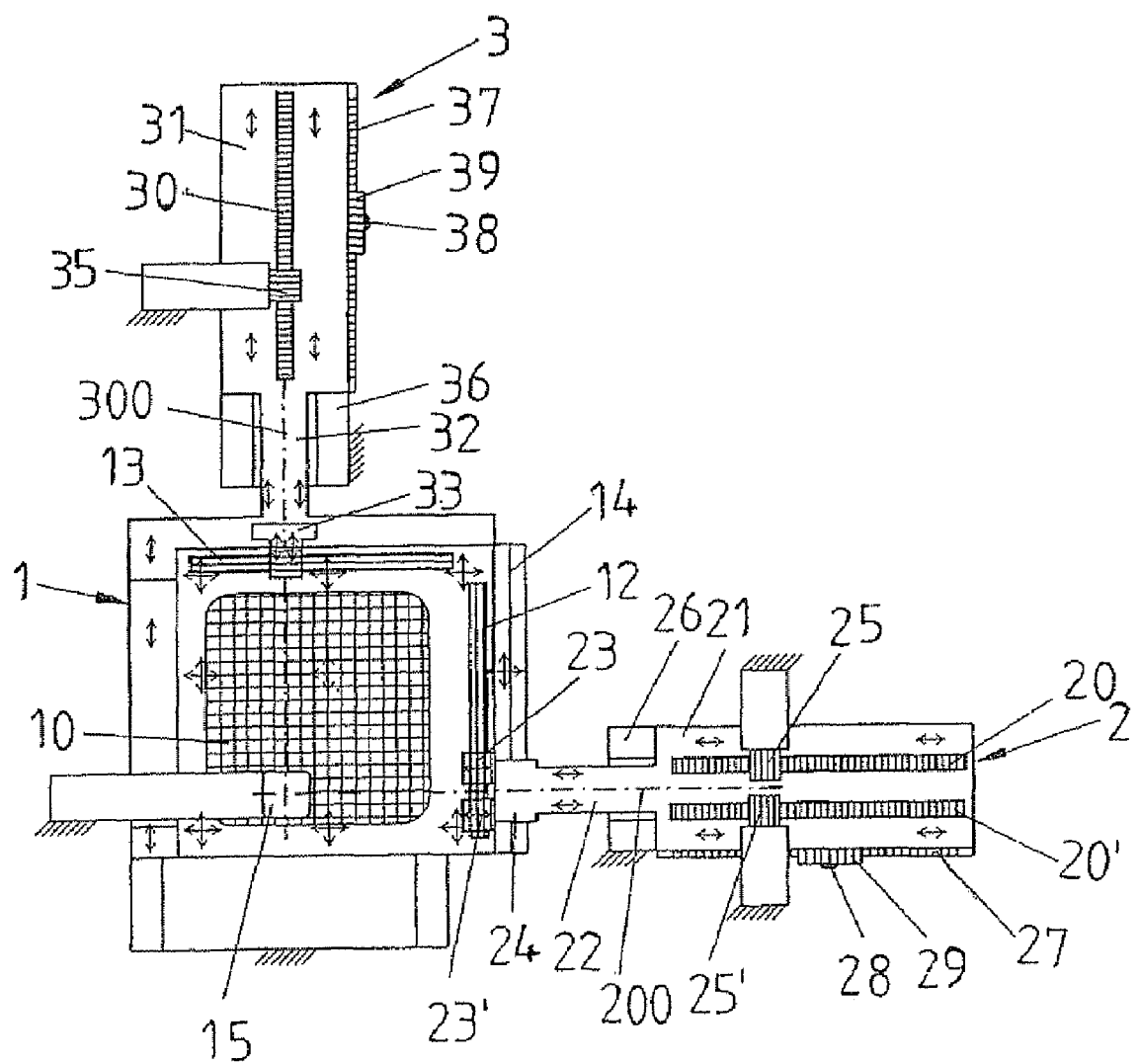

FIGS. 5a, 5b and 6 show a refinement of the arrangement illustrated in FIGS. 1 through 2c, the difference being that the length measuring device 2 assigned to first spatial direction x includes two scales 20, 20', situated in parallel to each other, set apart from each other (distance d) along the second spatial direction y, and guided on a common longitudinally movable guide part 21, each of which has a scanning head 25, 25' assigned to it for scanning the associated scale 20, 20' and a measuring head 23, 23' for scanning the associated measuring graduation 12 provided on measuring table 1 next to measuring plate 10.

This makes it possible to determine angle errors α of measuring table 1 or more precisely of upper plate 11 and thus of measuring plate 10 and take these into account when evaluating the measuring results or when machining an object outside of a so-called Abbe array. Thus, it is then not necessary, when measuring or machining, to situate the scanning device or the tool precisely in the intersection of measuring axes 200, 300 (Abbe array), which may involve a substantial structural effort. Rather, possible angle errors may be corrected by calculation.

From measured values $x^1_1$ and $x^2_1$, indicated in FIGS. 5a and 5b, which are obtained by scanning the two scales 20, 20' assigned to the first spatial direction x using scanning heads 25 25', and from measured values $x^1_g$ and $x^2_g$, which are obtained by scanning the measuring graduation 12 assigned to the first spatial direction x using measuring heads 23, 23', the angle error α of the cross guide is provided by:

$$\alpha = (x^1_1 + x^1_g - x^2_1 - x^2_g)/d.$$

In the event of a spatial deviation $d_x$, $d_y$ of scanning unit 15 or of a machining unit used in place of scanning unit 15 from the intersection of measuring axes 200, 300 along the two spatial directions x, y, the following is provided for the angle-corrected position values:

$$x = (x^1_1 + x^1_g + x^2_1 + x^2_g)/2 - \alpha * d_y$$

$$y = y_1 + y_g - \alpha * d_x.$$

The information thus obtained about angle error a of measuring table 1 or of upper plate 11 may be used in order to align an object to be situated on upper plate 11 and machined, such as for example a photosensitively coated plate to be exposed using a photomask or measuring table 1 itself such that the angle errors are compensated. Of course, the information regarding the angle error may also be used to align the photomask in accordance with the angle error. In any event, it is possible to ensure the correct alignment between the photosensitively coated plate and the photomask.

Thus it is possible to produce, among other things, measuring plates having a cross grating in a highly precise manner using a photolithographic process. The subsequent test of the accuracy of the cross grating may also be performed on such a measuring table in that length measuring devices 2, 3 are used to test the accuracy of the respective measuring plate, as described further above.

What is claimed is:

1. A device for determining a position of an object that is movable along at least one displacement direction, comprising:

a length measurement device assigned to each displacement direction and adapted to measure the position of the object along the respective displacement direction, the length measuring device including:

a scale, as a first component, extending along the respective displacement direction; and a scanning head, as a second component, adapted to scan the scale to measure a change in position of the scale with respect to the scanning head along the respective displacement direction, one of the two components being moved together with the object; and a determination device adapted to determine a distance of the component of the respective length measuring device that is movable together with the object, from the object along the extension direction of the scale;

wherein the determination device includes a measurement graduation as a first module and an associated measuring head as a second module, one of the two modules provided on the object and the other of the two modules provided on the component of the length measuring device that is movable together with the object.

2. The device according to claim 1, wherein the object is movable along two linearly independent displacement directions.

3. The device according to claim 2, wherein the components of each length measurement device that are not movable together with object are rigidly connected to each other.

4. The device according to claim 3, wherein the scale corresponds to the component of the length measurement device that is movable together with the object, and each scanning head is rigidly connected to one another.

5. The device according to claim 1, wherein the scale corresponds to the component of the length measurement device that is movable together with the object.

6. The device according to claim 5, wherein the scanning head is connected to the scale.

7. The device according to claim 1, wherein the measurement graduation is provided on the object.

8. The device according to claim 1, wherein the scanning head is connected to the component of the length measurement device that is movable together with the object.

9. The device according to claim 1, wherein the measurement graduation defines a measuring direction that coincides with the measuring direction of the respective length measurement device.

10. The device according to claim 1, wherein the scale includes an incremental track.

11. The device according to claim 1, wherein the measurement graduation includes an incremental graduation.

* * * * *